United States Patent
Khan et al.

(10) Patent No.: US 6,468,497 B1
(45) Date of Patent: Oct. 22, 2002

(54) METHOD FOR PRODUCING NANO-PARTICLES OF MOLYBDENUM OXIDE

(75) Inventors: Mohamed H. Khan, Tucson, AZ (US); James A. Cole, Ft. Madison; Joel A. Taube, Donnellson, both of IA (US)

(73) Assignee: Cyprus Amax Minerals Company, Phoenix, AZ (US)

( * ) Notice: Subject to any disclaimer, the term of this patent is extended or adjusted under 35 U.S.C. 154(b) by 41 days.

(21) Appl. No.: 09/709,838

(22) Filed: Nov. 9, 2000

(51) Int. Cl.⁷ .............................................. C01G 39/00
(52) U.S. Cl. ...................................................... 423/606
(58) Field of Search .................. 423/592, 606

(56) References Cited

U.S. PATENT DOCUMENTS

| | | | |
|---|---|---|---|
| 4,865,832 A | 9/1989 | Kamijyo | 423/606 |
| 5,045,516 A | 9/1991 | Vogel et al. | 502/309 |
| 5,185,133 A | 2/1993 | Scheftic et al. | 423/53 |
| 5,472,749 A | 12/1995 | Dravid et al. | 427/580 |
| 5,514,350 A | 5/1996 | Kear et al. | 422/198 |
| 5,665,277 A | 9/1997 | Johnson et al. | 264/6 |
| 5,698,483 A | 12/1997 | Ong et al. | 501/12 |
| 5,788,738 A | 8/1998 | Pirzada et al. | 75/331 |
| 5,804,151 A | 9/1998 | Sweetser et al. | 423/58 |
| 5,820,844 A | 10/1998 | Khan et al. | 423/606 |
| 5,851,507 A | 12/1998 | Pirzada et al. | 423/659 |
| 5,874,684 A * | 2/1999 | Parker et al. | |
| 5,879,715 A | 3/1999 | Higgins et al. | 424/489 |
| 5,922,299 A | 7/1999 | Bruinsma et al. | 423/335 |

* cited by examiner

Primary Examiner—Steven Bos
(74) Attorney, Agent, or Firm—Bruce E. Dahl, Esq.; Dahl & Osterloth LLP (57) ABSTRACT

Apparatus for producing nano-particles comprises a furnace defining a vapor region therein. A precipitation conduit having an inlet end and an outlet end is positioned with respect to the furnace so that the inlet end is open to the vapor region. A quench fluid port positioned within the precipitation conduit provides a quench fluid stream to the precipitation conduit to precipitate nano-particles within the precipitation conduit. A product collection apparatus connected to the outlet end of the precipitation conduit collects the nano-particles produced within the precipitation conduit.

9 Claims, 3 Drawing Sheets

METHOD FOR PRODUCING NANO-PARTICLES OF MOLYBDENUM OXIDE

FIELD OF THE INVENTION

This invention relates to the production of nano-particles in general and more particularly to a method and apparatus for producing nano-particles of molybdenum oxide.

BACKGROUND

Nano-particles, that is, particles having average sizes less than about 1 micrometer (i.e., 1 micron) are known in the art and are of interest because their nano-crystalline and/or other nano-scale features dramatically change the properties of the material. For example, certain materials fabricated from nano-particles often possess superior mechanical properties compared with the same material fabricated in a conventional manner and with conventionally-sized starting materials (e.g., powders). Nano-particles of other materials may also possess unique electrical and/or magnetic properties, thereby opening the door to the fabrication of materials having previously unforeseen properties and attributes. The extremely large surface area to weight ratio of nano-particles allows nano-particles to interact with their surroundings very quickly which can also lead to the fabrication of new materials having new properties.

In sum, it is recognized that the ability to produce any material in nano-particle form represents a unique opportunity to design and develop a wide range of new and useful mechanical, optical, electrical, and chemical applications, just to name a few. However, one problem that heretofore has limited the use of nano-particles is the difficulty in producing nano-particles of the desired size and composition on a commercial scale, e.g., by the kilogram instead of by the gram.

One method for producing nano-particles involves dissolving in a solvent precursor chemicals which define the composition of the final nano-particle product. The resulting composition is mixed to yield a solution which is substantially homogenous on a molecular level. The solvent is then evaporated at a sufficient rate so that the components in the homogenized solution are precipitated as a homogenized solid powder. While such wet processes have been used to produce nano-particles of various compositions, they are not without their problems. For example, such processes tend to produce larger particles along with the nano-particles, which must then be removed or separated from the nano-particles before the nano-particles can be used. Such wet processes can also involve a significant number of process steps and reagents which tend to increase the overall cost of the final nano-particle product.

Another method for producing nano-particles is a primarily mechanical process in which the precursor material is ground in a mill (e.g., a ball mill) until particles of the desired size are produced. Unfortunately, however, such grinding processes are energy intensive, require substantial amounts of time, and typically result in the production of a powder containing not only the desired nano-particle product, but also particles having larger sizes as well. Of course, such larger sized particles must be separated from the nano-particles before they can be used. The abrasive materials used in such milling and grinding processes also tend to contaminate the nano-particle material. Consequently, such grinding processes generally are not conducive to the production of a highly pure nano-particle product.

Several other processes have been developed in which the precursor material is vaporized, typically in a partial vacuum, and then rapidly cooled in order to initiate nucleation and precipitate the nano-particle material. For example, in one process, a stream of vaporized precursor material is directed onto the surface of a cold (i.e., refrigerated) rotating cylinder. The vapor condenses on the cold surface of the cylinder. A scraper placed in contact with the rotating cylinder scrapes off the condensed material, which is then collected as the nano-particle product. In another process, the vapor stream of precursor material is condensed by expanding the vapor stream in a sonic nozzle. That is, the vapor stream is initially accelerated in the converging portion of the nozzle, ultimately reaching sonic velocity in the throat of the nozzle. The vapor stream is then further accelerated to a supersonic velocity in the diverging section of the nozzle. The supersonic expansion of the vapor stream rapidly cools the vapor stream which results in the precipitation of nano-sized particles.

While the foregoing vaporization and cooling processes have been used to produce nano-particle materials, they are not without their problems. For example, the rotating cold cylinder process has proved difficult to implement on a large scale basis and has been less than successful in producing large quantities of nano-particle material. While the sonic nozzle process is theoretically capable of producing large quantities of nano-particles on a continuous basis, it requires the maintenance of a proper pressure differential across the sonic nozzle throughout the process. Another problem with the sonic nozzle process is that the nano-particle material tends to condense on the nozzle walls, which can seriously reduce the efficiency of the nozzle, and may even prevent it from functioning. While the condensation problem can be reduced by injecting a boundary layer stream along the nozzle walls, such a provision adds to the overall complexity and operational cost of the system.

Consequently, a need remains for a method and apparatus for producing nano-particles that does not suffer from the shortcomings of the prior art methods. Such a method and apparatus should be capable of producing large quantities of nano-particle product, preferably on a continuous basis, and at a low cost. Ideally, such a method and apparatus should be less sensitive to certain process parameters than other systems, thereby allowing the method and apparatus to be more easily practiced on a large scale (i.e., commercial) basis. Additional advantages could be realized if the method and apparatus produced nano-particles in a relatively narrow size range, with a minimum amount of larger sized particles and/or contaminant materials.

SUMMARY OF THE INVENTION

Apparatus for producing nano-particles according to the present invention may comprise a furnace defining a vapor region therein. A precipitation conduit having an inlet end and an outlet end is positioned with respect to the furnace so that the inlet end is open to the vapor region. A quench fluid port positioned within the precipitation conduit provides a quench fluid stream to the precipitation conduit to precipitate nano-particles within the precipitation conduit. A product collection apparatus connected to the outlet end of the precipitation conduit collects the nano-particles produced within the precipitation conduit.

A method for producing nano-particles from a precursor material comprises the steps of: Vaporizing the precursor material to produce a vapor; directing the vapor into an isolation chamber; contacting the vapor contained in the isolation chamber with a quench fluid stream to precipitate nano-particles; and removing the nano-particles from the isolation chamber.

BRIEF DESCRIPTION OF THE DRAWING

Illustrative and presently preferred embodiments of the invention are shown in the accompanying drawing in which.

DETAILED DESCRIPTION OF THE INVENTION

Apparatus 10 for producing nano-particles of a precursor material is shown and described herein as it may be used to produce nano-particles 12 (FIGS. 2–4) of molybdenum oxide ($MoO_3$) from a precursor material 14. Alternatively, the apparatus 10 may be used to produce nano-particles of other vaporizable or sublimable materials, as will be described in greater detail below. In the embodiment shown and described herein, the apparatus 10 for producing nano-particles 12 may comprise a sublimation furnace 16 having at least one vapor region 18 associated therewith. A precipitation conduit 20 having an inlet end 22 and an outlet end 24 extends into the vapor region 18 50 that the inlet end 22 of precipitation conduit 20 is exposed to vaporized (e.g., sublimated) material 36 contained within the vapor region 18. The outlet end 24 of conduit 20 is connected to a product collection apparatus 26 which collects the nano-particle product 12.

Figure 1:
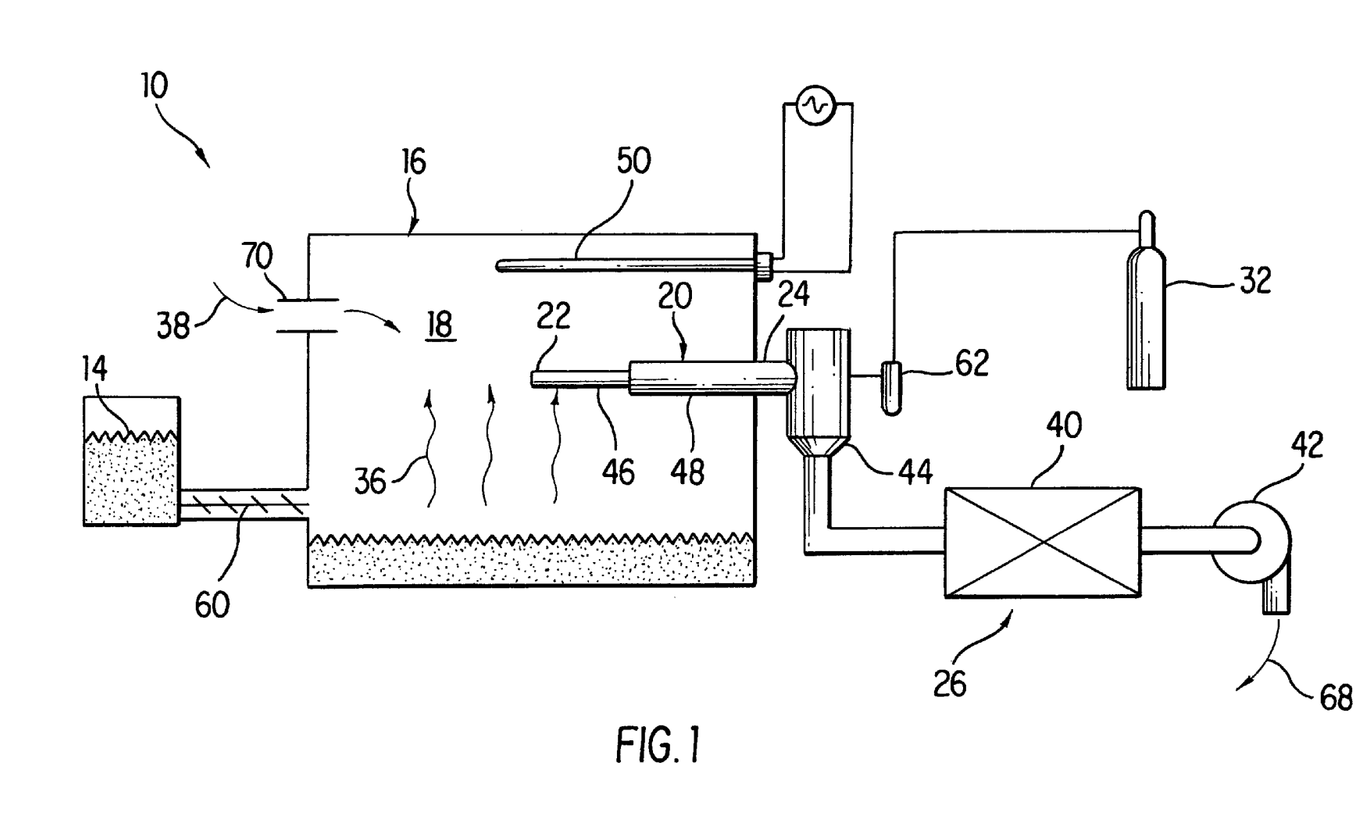
FIG. 1 is a schematic representation of the apparatus for producing nano-particles according to one embodiment of the invention.
Figure 2:
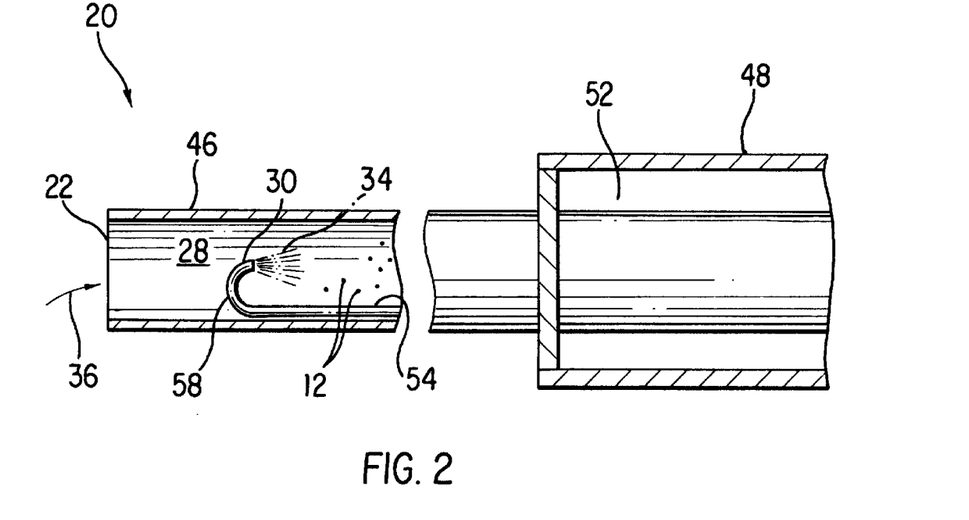
FIG. 2 is a cross-sectional view in elevation of the precipitation conduit in which the nano-particles are formed.

The inlet end 22 of precipitation conduit 20 is best seen in FIG. 2 and defines an isolation chamber 28 within which is provided a quench fluid port 30. The quench fluid port 30 is connected to a supply of a quench fluid 32, such as liquid nitrogen. See FIG. 1. The quench fluid is discharged from the quench fluid port 30 as a fluid stream 34. As will be described in greater detail below, the fluid stream 34 rapidly cools the vaporized material 36 flowing through the precipitation conduit 20. This rapid cooling results in the precipitation of the nano-particle material 12 within the precipitation conduit 20. The precipitated nano-particle material 12 continues to be carried along the precipitation conduit 20 to the product collection apparatus 26.

The product collection apparatus 26 may comprise a filter assembly 40 and a pump assembly 42 that is fluidically connected to the filter assembly 40. The pump assembly 42 draws or pumps the vaporized material 36 from the vapor region 18, into the precipitation conduit 20, and ultimately through the filter assembly 40. More specifically, the vaporized material 36 is converted within the precipitation conduit 20 into a carrier stream having the nano-particle material 12 suspended therein. The carrier stream containing the suspended nano-particle material 12 continues to be drawn through the precipitation conduit 20 under the action of pump 42, ultimately reaching the filter assembly 40. The filter assembly 40 removes the nano-particle material 12 from the carrier stream. The carrier stream is then discharged into the surrounding atmosphere as filtered carrier stream 68.

The apparatus 10 for producing nano-particles may be operated as follows to produce nano-particles of molybdic oxide ($MoO_3$). As a first step in the process, a suitable $MoO_3$ precursor material 14, such as $MoO_2$ or $MoO_3$, is fed into the sublimation furnace 16. The $MoO_3$ precursor material 14 is sublimed (i.e., converted directly to a vapor or gas state from a solid state without passing through a liquid state) within the sublimation furnace 16, resulting in the production of a sublimed or vapor state material 36. The sublimed or vapor state material 36 is generally contained within the vapor region 18. Depending on the composition of the precursor material 14, the sublimed (i.e., vaporized) material 36 may be combined with a suitable oxygen-containing carrier gas 38 (e.g., air) in order to fully oxidize the sublimed material. The carrier gas 38 may be allowed to enter the vapor region 18 through a suitable opening 70 provided therein. Such additional oxidation may be required or desired if the precursor material comprises "sub-oxide" material (e.g, $MoO_2$) and where the nano-particle material 12 is to be $MoO_3$.

Once the pump 42 of the product collection apparatus 26 is activated, it draws the sublimed or vaporized material 36 contained within the vapor region 18 into the inlet end 22 of precipitation conduit 20. The sublimed material 36 first enters the isolation chamber 28 (FIG. 2) which isolates the sublimated material from the vapor region 18. As the sublimated material 36 continues to flow through the conduit 20, the sublimed material 36 contacts and mixes with the quench fluid stream 34 emerging from the quench fluid port 30. The fluid stream 34 rapidly cools or quenches the sublimated material 36 (i.e., substantially adiabatically) which causes the precipitation of the nano-particle material 12. The precipitated nano-particle material 12 is generally suspended within a carrier stream (which may comprise air and/or other gaseous components remaining in the vapor stream 36 after the precipitation of the nano-particle material 12). Thereafter, the carrier stream containing the precipitated nano-particle material 12 continues to be carried along the conduit 20, whereupon it is ultimately collected by the filter 40 in the product collection apparatus 26. The filter 40 may be harvested from time to time to remove the accumulated nano-particle material 12.

Figure 4:
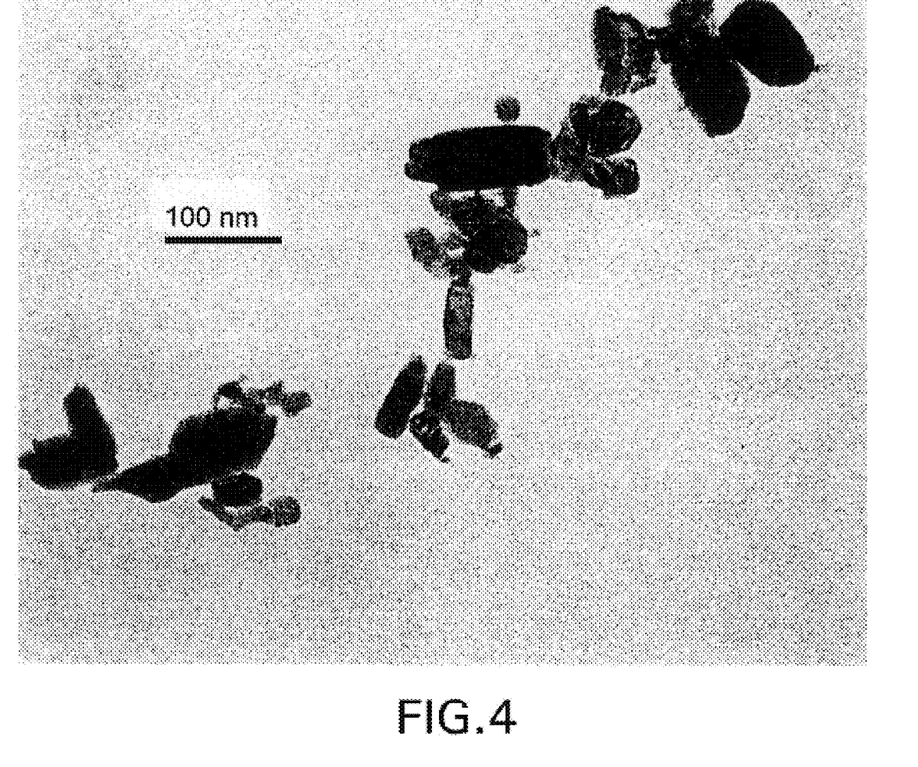
FIG. 4 is a transmission electron microscope image of an $MoO_3$ nano-particle product produced by the present invention.

The nano-particle material 12 of $MoO_3$ produced according to the method and apparatus of the present invention may be imaged in accordance with any of a wide range of microscopy processes that are now known in the art or that may be developed in the future that are suitable for imaging particles in the nano-size range. For example, FIG. 4 is an image of the nano-particle material 12 produced by a transmission electron microscope in a process generically referred to as transmission electron microscopy (TEM). As is readily seen in the TEM image illustrated in FIG. 4, each individual particle of the nano-particle material 12 comprises a generally cylindrically shaped, rod-like configuration having a mean length that is greater than the mean diameter. While the size of the nano-particle material 12 can be expressed in terms of the mean length or the mean diameter of the particles (e.g., as imaged by transmission electron microscopy), it is generally more useful to express the size of the nano-particle material 12 in terms of surface area per unit weight. Measurements of particle surface area per unit weight may be obtained by BET analysis. As is well-known, BET analysis involves an extension of the Langmiur isotherm equation using multi-molecular layer absorption developed by Brunauer, Emmett, and Teller. BET analysis is an established analytical technique that provides highly accurate and definitive results. In the embodiment shown and described herein, the method and apparatus of the present invention has produced nano-particle material having sizes in the range of about 4–44 square meters/gram ($m^2/g$) (15–35 $m^2/g$ preferred) as measured in accordance with BET analysis. Alternatively, other types of measuring processes may be used to determine the particle size.

A significant advantage of the present invention is that it can be used to produce nano-particles of $MoO_3$ in very large quantities and at a very low cost. The present invention is also relatively simple to construct, easy to operate, and is not overly sensitive to certain process parameters. Consequently, the present invention is ideally suited for use in large-scale (i.e., commercial) applications. The nano-particle material 12 produced by the present invention also contains particles within a fairly narrowly defined size range and with a minimum amount of larger-sized particles. Consequently, the nano-particle material 12 produced in accordance with the method and apparatus of the present invention may be generally regarded as a high quality product that requires little or no additional processing before it may be used.

Another advantage of the present invention is that it is generally immune to problems associated with the condensation of the nano-particle material on the internal components of the precipitation conduit 20. Consequently it is not necessary to take additional measures (e.g., the injection of an insulating boundary layer) to discourage the accumulation of nano-particle material on the internal components of the system. Moreover, even if the nano-particle product eventually accumulates on the internal components of the system, the simple design of the system will allow any such accumulation to be easily removed.

Still yet other advantages are associated with the quench fluid tube 54. For example, the quench fluid tube 54 may be readily fabricated from commonly available tubing and does not require the provision of any converging/diverging sections. The placement of the quench fluid tube 54 within the inner pipe member 46 further simplifies construction of the nano-particle apparatus.

Having briefly described the method and apparatus according to one embodiment of the present invention, as well as some of their more significant features and advantages, the various embodiments of the method and apparatus for producing nano-particles of the present invention will now be described in detail.

Referring back now to FIG. 1, one embodiment of the apparatus 10 for producing nano-particles is shown and described herein as it may be used to produce nano-particles 12 of molybdenum tri-oxide ($MoO_3$). Alternatively, however, the present invention could also be used to produce nano-particles of other vaporizable or sublimable materials, as would be obvious to persons having ordinary skill in the art after having become familiar with the teachings of the present invention. The apparatus 10 may comprise a sublimation furnace 16 having a vapor region 18 associated therewith. The sublimation furnace 16 is suitable for receiving a supply of the precursor material 14. The precursor material 14 may be delivered to the furnace 16 in either a continuous manner or in batches. For example, in one preferred embodiment, the precursor material 14 is fed into the sublimation furnace 16 on a continuous basis by a screw-type conveyor system 60. Alternatively, of course, other precursor materials, vaporizing devices and/or product delivery schedules may also be used.

In the embodiment shown and described herein, the sublimation furnace 16 comprises an electrically heated furnace having one or more electric heating elements 50 provided therein for elevating the temperature in the sublimation furnace 16 to a level sufficient to sublimate the precursor material 14. As is commonly understood, the terms "sublimate" or "sublimation" refer to processes wherein a material is transformed directly from the solid state to the gas or vapor state without passing through the liquid state. Sublimation of the precursor material 14 allows for the production of a highly pure $MoO_3$ product.

As an aside, it should be noted that while sublimation furnaces are currently used to produce highly purified $MoO_3$ powder (conventionally referred to as sublimed molybdic oxide), the particles comprising the resulting powder produced by currently used sublimation processes are considerably larger than the nano-sized particles produced with the method and apparatus of the present invention.

Continuing now with the description, it should be noted that the present invention is not limited to use with sublimation furnaces, but could instead utilize any of a wide range of other furnaces that are now known in the art or that may be developed in the future that are or would be suitable for vaporizing or sublimating the precursor material 14. Examples of other types of furnaces that could be utilized with the present invention include, but are not limited to, muffle furnaces, induction furnaces, vacuum furnaces, plasma arc furnaces, tube furnaces, and arc furnaces. Consequently, the present invention should not be regarded as limited to the sublimation furnace 16 that is shown and described herein.

As will be discussed in greater detail below, the furnace 16 may be provided with one or more openings or inlets 70 therein to allow a carrier gas 38 to enter the sublimation region 18. Depending on the application, the carrier gas could comprise an oxidizing gas, a reducing gas, or an inert gas. Stated another way, the inlet 70 and the particular carrier gas 38 that is allowed therein allows the vaporization or sublimation process to occur within a controlled gas atmosphere. In the embodiment shown and described herein, the carrier gas 38 is air, so the inlet 70 may be open to the surrounding atmosphere.

With reference now to FIGS. 1 and 2, the precipitation conduit 20 is positioned within the sublimation furnace 16 so that the inlet end 22 of precipitation conduit 20 is contained generally within the vapor region 18 defined by the furnace 16. The outlet end 24 of the precipitation conduit 20 may be connected to a collection manifold 44 which is then connected to the product collection system 26. See FIG. 1. Alternatively, the outlet end 24 of precipitation conduit 20 may be connected directly to the product collection system 26.

The precipitation conduit 20 may comprise a generally elongate, pipe-like member 46 that defines the inlet end 22 and the outlet end 24 (FIG. 3) of precipitation conduit 20. The elongate, pipe-like member 46 may be supported along at least a portion of its length by a generally elongate, pipe-like outer member 48, as best seen in FIG. 1. In the embodiment shown and described herein, pipe-like outer member 48 is generally concentrically aligned with pipe-like inner member 46 and is separated a spaced distance therefrom so that an insulating space or annulus 52 is defined between the inner and outer pipe-like members 46 and 48. See FIG. 2. The insulating annulus 52 is advantageous in that it helps to keep the inner pipe-like member 46 cool, thereby discouraging the re-vaporization of the precipitated nano-particle material 12 flowing through the inner pipe 46.

The inner and outer pipe-like members 46 and 48 may be fabricated from any of a wide variety of materials (e.g., high-temperature alloys and stainless steels) suitable for the intended application. By way of example, in one preferred embodiment, the inner pipe member 46 is fabricated from a high-temperature alloy (e.g., Hastelloy® "C") since the inlet end 22 of inner pipe 46 is exposed to the high temperatures in the vapor region 18. The outer pipe-like member 48 is fabricated from type SAE 316 stainless steel, although it could also be fabricated from other types of steel alloys.

The inner and outer pipe-like members 46 and 48 may have dimensions that are commensurate with the size (i.e., desired production capacity) of the apparatus 10 for producing nano-particles. In the embodiment shown and described herein, the inner pipe-like member 46 has an inside diameter of about 41.3 mm and a wall thickness of about 6.4 mm. The outer pipe-like member 48 may have an inside diameter of about 54 mm and a wall thickness of about 6 mm. Accordingly, the insulating space or annulus 52 will have a thickness of about 7 mm.

As was briefly described above, the inner, pipe-like member 46 is provided with a quench fluid port 30 that is suitable for discharging the quench fluid stream 34 into the inner, pipe-like member 46. See FIG. 2. In the embodiment shown and described herein, the quench fluid port 30 may comprise an elongate tube-like member or quench fluid tube 54 having an inlet end 56 and a J-shaped outlet end 58. The inlet end 56 of quench fluid tube 54 is connected to the supply of quench fluid 32, preferably via an accumulator 62. Accumulator 62 ensures that the quench fluid 32 (e.g., a cryogenic gas) supplied to the inlet end 56 of quench fluid tube 54 remains in the liquid state. The J-shaped outlet end 58 of quench fluid tube 54 defines the fluid port 30 and is positioned within the isolation chamber 28 so that the fluid port 30 is directed toward the outlet end 24 of precipitation conduit 20. Consequently, the quench fluid stream 34 discharged by the fluid port 30 is directed generally toward the outlet end 24 of precipitation conduit 20. See FIG. 3.

The location of the quench fluid port 30 within the isolation chamber 28 has some influence on the sizes of the nano-particles 12 produced by the apparatus 10 according to the present invention. For example, moving the location of the fluid port 30 closer to the inlet end 22 of precipitation conduit 20 generally results in larger nano-particles 12 being produced. Conversely, moving the location of the fluid port 30 away from the inlet end 22 generally results in smaller nano-particles 12. However, other factors can also affect the particle size. For example, smaller nano-particles can be produced even when the fluid port 30 is positioned closer to the inlet end 22 of fluid conduit 20 by increasing the flow rate of the product collection device 26. That is, higher flow rates (e.g., in liters/minute) will result in a higher velocity flow within the precipitation conduit 20. Of course, the velocity within the precipitation conduit 20 can also be changed by varying the inside diameter of the inner pipe 46. In another embodiment, the quench fluid port 30 may be positioned within the collection manifold 44. If so, the collection manifold 44 is regarded as part of the precipitation conduit. However, we have found that it is generally preferable to position the quench fluid port 30 within the precipitation conduit 20 in the manner shown and described herein.

Since the sizes of the nano-particles produced by the apparatus of the present invention are related to several structural and operational parameters of the invention, as described herein, the present invention should not be regarded as limited to any particular parameters or range of parameters for any given structural or operational configuration. For example, in the embodiment shown and described herein, the quench fluid port 30 is positioned within the isolation chamber 28 so that quench fluid port 30 is located about 16.5 cm from the inlet end 22 of precipitation conduit 20. This position, combined with the other parameters specified herein, will result in the formation of a nano-particle product substantially as described herein. However, depending on the flow rite provided by the product collection system 26, good results have also been obtained by positioning the quench fluid port 30 in the range of about 150–360 mm from the inlet end 22 of precipitation conduit 20. As mentioned above, it is also possible to position the quench fluid port 30 within the collection manifold 44, and such a positioning may be advantageous depending on the particular nano-particle product that is to be produced as well as on certain other process parameters.

The quench fluid tube 54 may be made from any of a wide range of materials (e.g., stainless steels) that would be suitable for the intended application. By way of example, the quench fluid tube 54 utilized in one embodiment of the invention is fabricated from type SAE 316 stainless steel. The size (i.e., inside diameter) of the quench fluid tube 54 may vary depending on the size (i.e., overall production capacity) of the apparatus 10. In the embodiment shown and described herein, the quench fluid tube 54 has an inside diameter of about 4 mm. Alternatively, of course, other tube sizes may be used, as would be obvious to persons having ordinary skill in the art after having become familiar with the teachings of the present invention.

While the quench fluid port 30 in one embodiment of the invention is provided by means of the J-shaped outlet end 58 of the quench fluid tube 54, other configurations are possible. For example, in another embodiment, the inner pipe 46 is provided with an integral flow channel therein that terminates in a discharge arm having a fluid outlet therein. The discharge arm may be generally radially oriented within the isolation chamber defined by the inner pipe and the fluid outlet may be positioned so that it is generally aligned with the central axis of the inner pipe. Such an arrangement allows the quench fluid to be discharged at about the center of the inner pipe.

It is generally preferred, but not required, to position a temperature sensor, such as a thermocouple (not shown) within the interior region of the precipitation conduit 20 at a location downstream of the quench fluid port 30 (i.e., between the quench fluid port 30 and the outlet end 24 of conduit 20). The output signal (not shown) from the thermocouple (also not shown) may then be monitored to maintain the temperature of the carrier stream and suspended nano-particle product 12 within a desired temperature range that is appropriate for the particular nano-particle material 12 being produced. By way of example, in one preferred embodiment, the thermocouple is positioned about 240 mm downstream of the quench fluid port 30. Alternatively, the thermocouple may be located at other positions.

Figure 3:
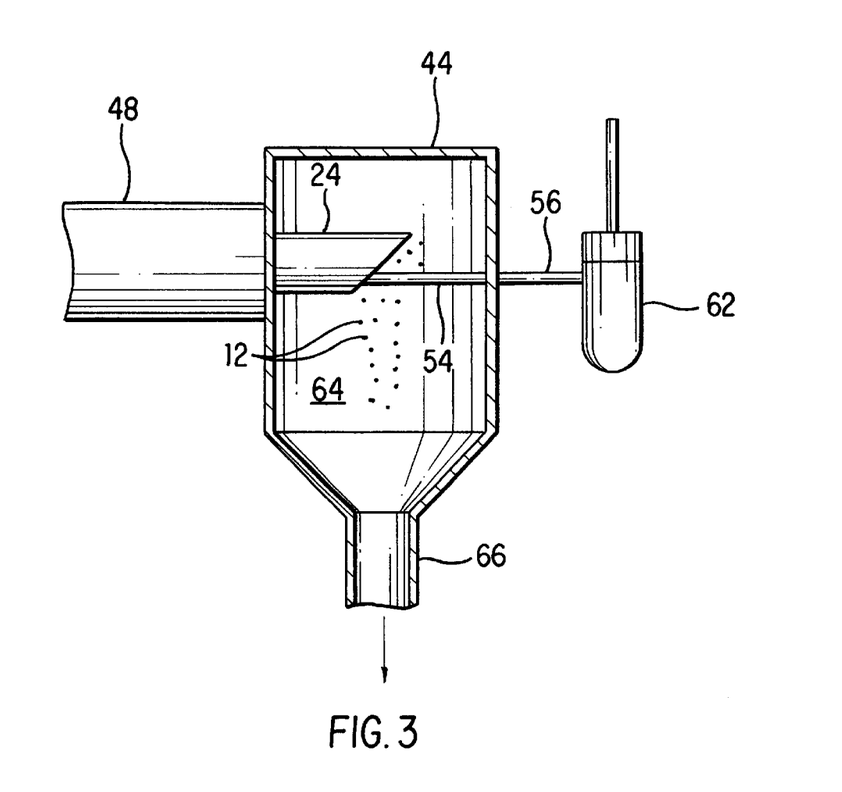
FIG. 3 is a cross-sectional view in elevation of the product collection manifold.

The collection manifold 44 is best seen in FIG. 3 and serves as a convenient means for directing the nano-particles toward the product collection system 26 while allowing the supply of quenching fluid 32 to be directed into the quench fluid tube 54. More specifically, in the embodiment shown and described herein the collection manifold 44 defines an interior chamber 64 having an outlet end 66 that is connected to the product collection system 26. The outlet end 24 of the inner pipe 46 of precipitation conduit 20 terminates within the interior chamber 64 so that nano-particle material 12 exiting the precipitation conduit 20 is conveyed to the outlet end 66 of collection manifold 44. The outer support pipe 48 of precipitation conduit 20 may be secured to the collection manifold 44 (e.g., by welding) to allow the collection manifold 44 to be supported by the outer support pipe 48. The quench fluid tube 54 may pass through the collection manifold 44 where it is ultimately connected to the accumulator 62.

The collection manifold 44 may be fabricated from any of a wide range of materials suitable for the intended application, as would be obvious to persons having ordinary skill in the art after having become familiar with the teachings of the present invention. By way of example, in one preferred embodiment, the collection manifold 44 is fabricated from type SAE 316 stainless steel, although other mild steel alloys, ceramics, or other suitable materials may also be used.

The product collection system 26 is best seen in FIG. 1 and may comprise a blower or pump 42 and filter assembly 40. The blower or pump 42 draws the vaporized precursor material 36 through the precipitation conduit 20, the collection manifold 44, and filter assembly 40. More precisely, the vaporized material 36 is converted within the precipitation conduit 20 into a carrier stream having the nano-particle material 12 suspended therein. The carrier stream containing the suspended nano-particle material 12 continues to be drawn through the precipitation conduit 20 under the action of pump 42, ultimately reaching the filter assembly 40. The filter assembly 40 removes the nano-particle material 12 from the carrier stream. The carrier stream is then discharged into the surrounding atmosphere as filtered carrier stream 68. The filter assembly 40 may be harvested from time to time to remove the captured nano-particle material 12.

The blower or pump 42 utilized in the product collection system 26 may comprise any of a wide range of air pump devices that are well-known in the art and readily commercially available. By way of example, in one preferred embodiment, the pump 42 comprises a centrifugal blower having a capacity of about 2800 (e.g., 2831) liters per minute. Alternatively, the pump 42 may have either a larger or smaller capacity depending on the intended production capacity of the nano-particle production apparatus 10. In another embodiment, the pump 42 may be provided with a variable capacity to allow the user to vary the flow rate of the pump 42 to more easily effect certain changes in the sizes of the nano-particle material 12.

The filter assembly 40 may comprise any of a wide range devices suitable for removing small particles from an air stream. By way of example, in the embodiment shown and described herein, the filter assembly 40 comprises a particulate filter medium fabricated from Gore-Tex®. The filter material should be sufficiently fine so that it will capture substantially all of the nano-particle material 12 exiting the collection manifold 44. However, since filters for capturing such nano-sized particles are well-known in the art and could be easily provided by persons having ordinary skill in the art after having become familiar with the teachings of the present invention, the filter utilized in one preferred embodiment of the present invention will not be described in further detail herein.

In an alternative arrangement, the filter assembly 40 may comprise a liquid scrubber-type filter wherein the nano-particle material 12 is collected by bubbling the carrier stream and nano-particle material 12 through a liquid (e.g., alcohol), although other liquids may be used. The liquid captures the nano-particle material which may thereafter be removed from the liquid by conventional techniques. Still other filtering devices and processes are possible and could be used to capture and remove the nano-particle product 12 from the carrier stream, as would be obvious to persons having ordinary skill in the art after having become familiar with the teachings of the present invention. Consequently, the present invention should not be regarded as limited to the particular product collection apparatus shown and described herein.

The supply of quench fluid 32 may comprise a supply of a fluid suitable for effecting the rapid (i.e., substantially adiabatic) cooling of the vaporized precursor material 36. Toward this end, it is generally preferable that the supply of quench fluid 32 comprise a supply of a cryogenic fluid. As used herein, the term "cryogenic fluid" refers to a liquids that boil at temperatures of less than about 110 K (−163.15° C.) at atmospheric pressure. Cryogenic fluids include, but are not limited to, hydrogen, helium, nitrogen, oxygen, argon air, and methane. In the embodiment shown and described herein, the supply of quench fluid 32 comprises a supply of liquid nitrogen. In order to provide optimal quenching performance, it is generally preferable to place an accumulator 62 between the supply of quench fluid 32 and the inlet 56 of quench fluid tube 54. The accumulator 62 helps to ensure that the quench fluid enters the tube 54 as a liquid, as opposed to a liquid/gas mixture. Alternatively, a liquid/gas mixture can be used if increased flow-rates are desired and the end temperature is maintained within the appropriate range. Accordingly, the quench fluid 32 may enter the quench fluid tube 54 as either a pure liquid, a pure gas, or a mixture thereof so long as the temperature sensed by the thermocouple (not shown) positioned within the precipitation conduit 20 is maintained at the appropriate temperature for the particular nano-particle material 12.

The accumulator 62 may comprise any of a wide range of accumulators that are well-known in the art and that are readily commercially available. Consequently, the accumulator 62 that may be utilized in one preferred embodiment of the invention will not be described in greater detail herein.

The apparatus 10 may be operated in accordance with the following method in order to produce nano-particles 12 of $MoO_3$. The nano-particles 12 of $MoO_3$ are produced from a precursor material 14 that may comprise any of a wide range of molybdenum compounds and oxides that are convertible into $MoO_3$. For example, in one preferred embodiment, the precursor material may comprise a so-called "technical grade" molybdic oxide ($MoO_3$) powder having a typical size of about 200 U.S. Tyler mesh and preferably less than about 100 U.S. Tyler mesh. The technical grade molybdic oxide ($MoO_3$) precursor material 14 may be produced in accordance with any of a variety of processes that are well-known in the art, such as roasting processes and so-called "wet" processes. For example, the $MoO_3$ precursor material 14 may be produced according to the process disclosed in U.S. Pat. No. 5,804,151, entitled "Process for Autoclaving Molybdenum Disulfide" issued Sep. 8, 1998, which is hereby incorporated herein by reference for all that it discloses. Alternatively, the $MoO_3$ precursor material 14 may be produced according to the process disclosed in U.S. Pat. No. 5,820,844, entitled "Method for the Production of a Purified $MoO_3$ Composition," issued Oct. 13, 1998, which is also incorporated herein by reference for all that it discloses. Technical grade $MoO_3$ powder is also readily commercially available from the Climax Molybdenum Company of Ft. Madison, Iowa, 52627 (USA), which is a subsidiary of Phelps Dodge Corporation.

Other precursor materials are available and could also be used in conjunction with the present invention, as would be obvious to persons having ordinary skill in the art after having become familiar with the teachings of the present invention. For example, in another embodiment, the precursor material 14 may be comprised entirely of molybdenum "sub-oxides" (e.g., $MoO_2$), or some combination of molybdenum "sub-oxides" and $MoO_3$. If so, the amount of molybdenum sub-oxides may be subsequently oxidized by providing an oxidizing atmosphere in the vapor region 18. The oxidizing atmosphere will oxidize any sub-oxides contained in the precursor material 36 before the same is drawn into the precipitation conduit 20. Additional oxygen for the oxidization process may be obtained from the carrier gas 38 (e.g., air) that is allowed to enter the vapor region 18 of the sublimation furnace 16 via the carrier gas inlet 70. Alternatively, a separate supply of an oxygen-containing gas may be provided to the vapor region 18 in order to provide the oxidizing atmosphere required to fully oxidize any sub-oxide compounds that may be present. Of course, the carrier gas could comprise other materials depending on the particular process. For example, the carrier gas 38 could also comprise a reducing gas or an inert gas.

Regardless of the particular precursor material 14 that is utilized (e.g., either $MoO_3$ or $MoO_2$), the precursor material 14 may be fed into the sublimation furnace 16 in either a continuous manner or in batches. In the embodiment shown and described herein, the precursor material 14 is fed into the furnace 16 in a continuous manner by a screw-type conveyer system 60. Once the precursor material 14 is delivered to the sublimation furnace 16, the sublimation furnace 16 heats the precursor material 14 to a temperature in the range of about 800°–1300° C. (with optimum results being obtained within a temperature range of about 1093°–1260° C.), which is sufficient to sublime the $MoO_3$ precursor material 14, resulting in the production of a vaporized or sublimed precursor material 36. As mentioned above, sublimation is a process wherein the precursor material transitions to a gaseous or vapor state directly from a solid state without passing through a liquid state. Sublimation of the precursor material 14 allows the production of a highly purified nano-particle product 12.

The sublimed or vaporized precursor material 36 may be combined with a carrier gas 38, such as air or any other desired atmosphere, to assist in the flow of the vaporized or sublimed precursor material 36 into the inlet end 22 of the precipitation conduit 20. As mentioned above, the carrier gas 38 may serve as a source of additional oxygen to oxidize any sub-oxides that may be contained in the vaporized precursor material 36. Alternatively, the carrier gas 38 may comprise an inert gas or may be supportive of reduction reactions if required or desired. The vaporized precursor material 36 (along with the carrier gas 38) is drawn into the inlet end 22 of the precipitation conduit 20 by the action of pump 42. Upon being drawn into the inlet end 22 of precipitation conduit 20, the vaporized precursor material 36 enters the isolation chamber 28. Isolation chamber 28 isolates the vaporized precursor material 36 from the vapor region 18. As the vaporized precursor material 36 continues to travel down the precipitation conduit 20, it eventually contacts the quench fluid stream 34 being discharged by the quench fluid port 30 provided on the J-shaped outlet end 58 of quench fluid tube 54. The quench fluid stream 34 being discharged by the fluid port 30 is considerably cooler than the vaporized precursor material 36. This results in the rapid (i.e., substantially adiabatic) cooling of the vaporized precursor material 36. The rapid cooling results in the precipitation of the nano-particle product 12 from the vaporized precursor material 36. The resulting mixture of precipitate (in the form of the nano-particle product 12) and carrier stream (e.g., air or inert or other gas atmosphere) continues to be carried down the precipitation conduit 20, whereupon it is discharged into the collection manifold 44. Thereafter, the nano-particle product 12 is ultimately captured by the filter 40 of the product collection system 26. The remaining carrier stream passes through the pump 42 and is discharged into the surrounding atmosphere as filtered carrier stream 68.

As mentioned above, any of a wide range of liquified gases, preferably cryogenic gases, may be used as the quench fluid to effect the rapid cooling of the vaporized precursor material 36. In the embodiment shown and described herein, liquid nitrogen is used as the quench fluid and is provided to the inlet end 56 of quench fluid tube 54 at a pressure in the range of about 1.3–8.3 bar (5.1–7.6 bar preferred). The accumulator 62 ensures that the quench fluid (e.g., nitrogen) enters the inlet end 56 as a liquid, as opposed to a liquid/gas mix or in a gaseous form.

FIG. 4 is an image of the nano-particle material 12 produced by a transmission electron microscope in a process that is commonly referred to as transmission electron microscopy (TEM). As is readily seen in FIG. 4, each individual particle of the nano-particle material 12 comprises a generally cylindrically shaped, rod-like configuration having a mean length that is greater than its mean diameter. While the size of the nano-particle material 12 can be expressed in terms of the mean length or the mean diameter of the particles (e.g., as detected by transmission electron microscopy), it is generally more useful to express the size of the nano-particle material 12 in terms of surface area per unit weight due to the correlation between size and surface area. Measurements of particle surface area per unit weight may be obtained by BET analysis which is, as mentioned above, an established analytical technique that provides highly accurate and definitive results. In the embodiment shown and described herein, the method and apparatus of the present invention has been used to produce a nano-particle material having a size in the range of about 4–44 square meters/gram ($m^2/g$) (15–35 $m^2/g$ preferred) as measured in accordance with the BET analysis technique. Alternatively, other types of measuring processes may be used to determine the particle size.

EXAMPLE

In this Example, the precursor material comprised a "technical grade" molybdic oxide ($MoO_3$) powder having a typical size of about 24–260 microns. Such technical grade molybdic oxide powder is produced by the Climax Molybdenum Company of Fort Madison, Iowa, and is readily commercially available therefrom. The precursor material was provided to an electrically heated sublimation furnace of the type described above having a capacity to sublimate or vaporize approximately 284 kg/hr of precursor material. In this Example, the capacity of the sublimation furnace is considerably greater than was required to produce the amount of nano-particle material 12 described in this Example. This is because the sublimation furnace is used in a conventional manner to produce a highly purified sublimed $MoO_3$ material in accordance with a conventional process. The conventionally produced sublimed $MoO_3$ material comprises particles that are much larger than the nano-sized particles produced according to the present invention. Therefore, most of the sublimed or vaporized $MoO_3$ produced by the furnace was used in the conventional process, with only a small portion being drawn-off through the precipitation conduit to produce the nano-particle material in accordance with the method and apparatus of the present invention.

A precipitation conduit having the configuration and dimensions of the precipitation conduit described above was mounted within the vapor region contained within the sublimation furnace. The precipitation conduit was connected to a collection manifold which was connected to a product collection apparatus. The inlet end of the quench fluid tube was connected to a supply of quench fluid (e.g., liquid nitrogen) in accordance with the description provided herein. The technical grade $MoO_3$ precursor material was fed into the sublimation furnace in a continuous manner by a screw type conveyer system. Once within the furnace, the $MoO_3$ precursor material was heated to a temperature of about 1100° C. which was sufficient to sublime the $MoO_3$ precursor material. The pump associated with the product collection apparatus was then turned on. As mentioned above, the pump has a capacity of about 2831 liters/minute. Liquid nitrogen was utilized as the quenching fluid and was introduced into the inlet end of the quench fluid tube at a pressure of about 1.3 bar. An accumulator was used to ensure that the nitrogen entered the quench fluid tube as a liquid. Once the nitrogen flow was initiated, the apparatus started to produce the nano-particle material, which was thereafter captured by the filter assembly associated with the product collection apparatus. The flow-rate of the liquid nitrogen quench fluid was such that the temperature of the carrier stream containing the nano-particle product 12 as measured by the thermocouple positioned within the precipitation conduit 20 was maintained in the range of about 37–54° C. The apparatus was operated in this manner for a time period of about 120 minutes, which resulted in the production of about 2.26 kg of nano-particle material.

It is readily apparent that the apparatus and process discussed herein may be used to produce large quantities of $MoO_3$ nano-particle material with much simpler apparatus and without being overly sensitive to certain process control parameters. Consequently, the claimed invention represents an important development in nano-particle technology in general and to molybdenum nano-particle technology in particular. Having herein set forth preferred embodiments of the present invention, it is anticipated that suitable modifications can be made thereto which will nonetheless remain within the scope of the present invention. Therefore, it is intended that the appended claims be construed to include alternative embodiments of the invention except insofar as limited by the prior art.

What is claimed is:

1. A method for producing nano-particles from an $MoO_3$ precursor material, comprising:

vaporizing the $MoO_3$ percursor material to produce a vapor;

directing said vapor into an isolation chamber;

contacting said vapor contained in said isolation chamber with a quench fluid stream, said quench fluid stream cooling said vapor to produce the nano-particles; and removing said nano-particles from said isolation chamber.

2. A method for producing nano-particles of $MoO_3$, comprising:

providing a supply of $MoO_3$ precursor material;

sublimating the $MoO_3$ precursor material to produce $MoO_3$ vapor;

conducting said $MoO_3$ vapor to an isolation chamber;

contacting said $MoO_3$ contained in said isolation chamber with a quench fluid stream, said quench fluid stream cooling said $MoO_3$ vapor to produce said nano-particles of $MoO_3$ in a carrier stream; and removing said nano-particles of $MoO_3$ in said carrier stream from said isolation chamber.

3. The method of claim 2, wherein said sublimating the $MoO_3$ precursor material takes place at a temperature in the range of about 1093–1260° C.

4. The method of claim 3, wherein said quench fluid stream comprises nitrogen.

5. The method of claim 2, wherein said conducting step and said contacting step are carried out on a continuous basis.

6. The method of claim 2, further comprising separating said nano-particles of $MoO_3$ from said carrier stream.

7. The method of claim 6, wherein said separating said nano-particles of $MoO_3$ from said carrier stream comprises:

filtering said nano-particles of $MoO_3$ from said carrier stream using a filter; and removing said nano-particles of $MoO_3$ from the filter.

8. The method of claim 2, wherein said contacting said $MoO_3$ contained in said isolation chamber with a quench fluid stream, comprises:

providing a quench fluid tube having an inlet end and an outlet end, the outlet end of the quench fluid tube being contained in the isolation chamber; and injecting liquid nitrogen into the inlet end of said quench fluid tube.

9. The method of claim 8, wherein said injecting liquid nitrogen into the inlet end of the quench fluid tube is conducted at a pressure in the range of about 1.3–8.3 bar.

* * * * *

UNITED STATES PATENT AND TRADEMARK OFFICE
CERTIFICATE OF CORRECTION

PATENT NO. : 6,468,497 B1
DATED : October 22, 2002
INVENTOR(S) : Mohamed H. Khan et al.

It is certified that error appears in the above-identified patent and that said Letters Patent is hereby corrected as shown below:

Column 3,
Line 33, delete the number "50" and insert therefor -- so --;

Column 8,
Line 7, delete the word "rite" and insert therefor -- rate --;

Column 9,
Lines 45 and 46, please insert the word -- of -- after the word "range", and before the word "devices";

Column 10,
Line 13, please delete the word "a" following the word "to" and before the word "liquids".

Signed and Sealed this

Twenty-fourth Day of February, 2004

JON W. DUDAS
*Acting Director of the United States Patent and Trademark Office*